United States Patent
Kamp et al.

(10) Patent No.: US 9,464,724 B2
(45) Date of Patent: Oct. 11, 2016

(54) CHECK VALVE FLAPPER

(71) Applicant: HAMILTON SUNDSTRAND CORPORATION, Windsor Locks, CT (US)

(72) Inventors: Josh Kamp, Glastonbury, CT (US); Feng Feng, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 48 days.

(21) Appl. No.: 14/452,571

(22) Filed: Aug. 6, 2014

(65) Prior Publication Data

US 2016/0040792 A1    Feb. 11, 2016

(51) Int. Cl.
*F16K 15/03* (2006.01)

(52) U.S. Cl.
CPC ............. *F16K 15/03* (2013.01); *F16K 15/038* (2013.01); *Y10T 137/7839* (2015.04); *Y10T 137/7898* (2015.04)

(58) Field of Classification Search
CPC ................ F16K 15/038; F16K 15/03; Y10T 137/7898; Y10T 137/7839
USPC ............................................. 137/512.1, 527
See application file for complete search history.

(56) References Cited

U.S. PATENT DOCUMENTS

| | | | |
|---|---|---|---|
| 7,493,770 B2 | 2/2009 | Christianson et al. | |
| 8,181,669 B2 * | 5/2012 | Dehais | F16K 15/038 137/512.1 |
| 2010/0282340 A1 | 11/2010 | Dehais et al. | |
| 2013/0233412 A1 | 9/2013 | Moren et al. | |
| 2013/0340862 A1 | 12/2013 | Kamp et al. | |

* cited by examiner

*Primary Examiner* — Craig Schneider
*Assistant Examiner* — P. Macade Nichols
(74) *Attorney, Agent, or Firm* — Cantor Colburn LLP (57) ABSTRACT

A check valve flapper for a check valve is provided and includes a flapper body and a hinge portion extending from the flapper body. The hinge portion includes a lower ear, a middle ear, and an upper ear. The lower ear, the middle ear, and the upper ear each include a hinge pin hole having a hinge pin hole diameter and an ear outer radius. A ratio of the hinge pin hole diameter to the ear outer radius is between 0.83 and 0.91.

6 Claims, 7 Drawing Sheets

CHECK VALVE FLAPPER

BACKGROUND OF THE INVENTION

The subject matter disclosed herein relates to a check valve and, more particularly, to a flapper for a check valve.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes flappers that occupy closed positions when the high pressure stage bleed air has a higher pressure than the low pressure stage compressor, whereby the high pressure stage bleed air is prevented from backflowing into the low pressure stage compressor. These flappers open when the pressure of the low pressure stage compressor exceeds that of the high pressure stage bleed air.

When the flappers open, they often pivot at a relatively high angular velocity about a hinge pin and impact the check valve housing, which is normally provided with a compliant stop. Opposite sides of the compliant stop form contact areas with each of the flappers that are each limited in size and their respective ability to absorb the impacts. An interface between the hinge pin and the flappers, as well as an interface between the hinge pin and the check valve housing, are also subject to fatigue wear as opening and closing cycles of the flappers pivoting about the hinge pin are repeated over a period of time. Structurally withstanding the high opening velocities and the repeated impacts between the compliant stop and the flappers has, thus, proven to be challenging.

BRIEF DESCRIPTION OF THE INVENTION

According to one aspect of the invention, a check valve flapper for a check valve is provided and includes a flapper body and a hinge portion extending from the flapper body. The hinge portion includes a lower ear, a middle ear, and an upper ear. The lower ear, the middle ear, and the upper ear each include a hinge pin hole having a hinge pin hole diameter and an ear outer radius. A ratio of the hinge pin hole diameter to the ear outer radius is between 0.83 and 0.91.

According to another aspect of the invention, a. method of installing check valve flappers in a check valve is provided. A hinge portion of a first check valve flapper is arranged opposite a hinge portion of a second check valve flapper. A hinge pin is inserted through a first hinge support of a check valve housing, through the hinge portions of the first and second check valve flappers, and through a second hinge support of the check valve housing. Each of the first and second check valve flappers includes a flapper body and the hinge portion extending therefrom. The hinge portion includes a lower ear, a middle ear, and an upper ear. The lower ear, the middle ear, and the upper ear each include a hinge pin hole having a hinge pin hole diameter and an ear outer radius. A ratio of the hinge pin hole diameter to the ear outer radius is between 0.83 and 0.91.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and can withstand high opening and closing velocities of check valve flappers.

Figure 1:
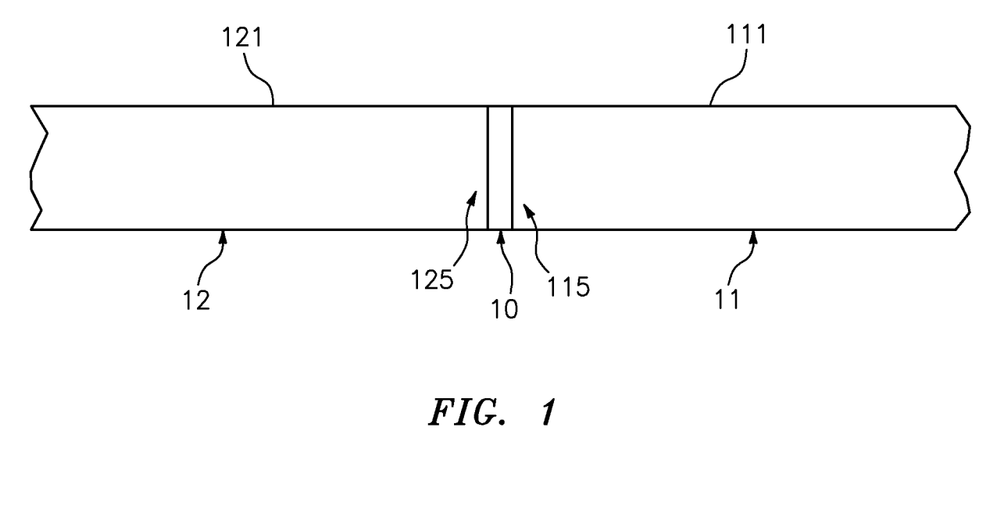
FIG. 1 is a schematic view of a check valve interposed between duct assemblies according to an embodiment.

With reference to FIGS. 1-4, a check valve 10 is provided. The check valve 10 is interposed between upstream ductwork 11 and downstream ductwork 12. As shown in FIG. 1, the upstream ductwork 11 is formed of a single duct assembly 111 and the downstream ductwork 12 is similarly formed of a single duct assembly 121. This configuration is, of course, exemplary, and it is to be understood that alternate configurations are possible, such as multiple upstream and/or downstream duct assemblies coupled to the check valve 10.

Figure 2:
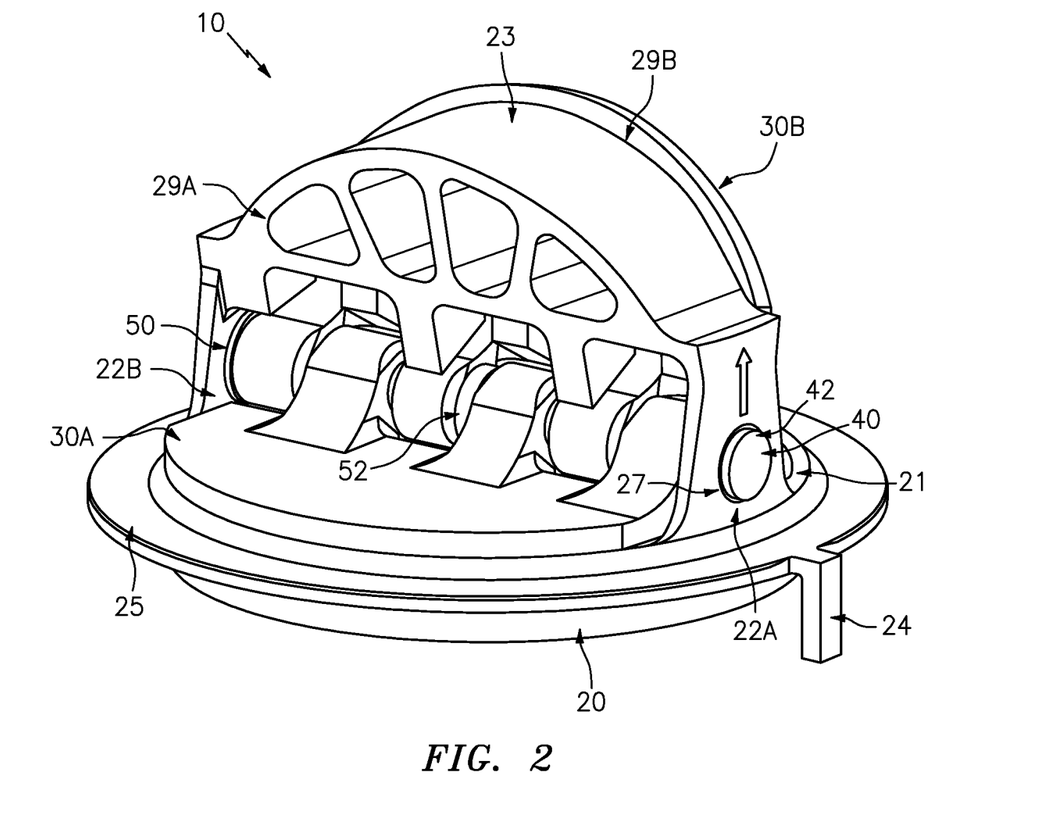
FIG. 2 is a perspective view of a check valve according to an embodiment.

As shown in FIG. 2, the check valve 10 includes a check valve housing 20 and first and second check valve flappers 30A and 30B. The first and second check valve flappers 30A and 30B can share a common design. The check valve housing 20 includes a seat 21, a first and second hinge support 22A and 22B, and a stop 23. The seat 21 is annularly shaped and is formed to define an aperture 100 (see FIG. 3) that extends axially from an upstream end of the seat 21, which is associated with the upstream ductwork 11, to a downstream end of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end 115 (see FIG. 1) of the upstream ductwork 11 and a complementary forward end 125 (see FIG. 1) of the downstream ductwork 12. The check valve housing 20 may also include a tab 24 that extends from a check valve flange 25 to ensure that the check valve 10 is installed in the proper position and direction relative to the upstream ductwork 11 and the downstream ductwork 12. The check valve flange 25 provides a mating interface with the upstream ductwork 11 and the downstream ductwork 12.

The first and second hinge supports 22A and 22B are coupled to opposite ends of the stop 23. The first and second hinge supports 22A and 22B provide support for a hinge pin 40 at respective first and second hinge pin interfaces 26 and 28 (see FIG. 4). When installed, the hinge pin 40 has a central pivot axis CP (see FIG. 4) disposed to bifurcate the aperture 100 defined by the seat 21 to thereby further define a pair of openings 101 (see FIG. 3). The first hinge support 22A is configured to receive a hinge pin head 42 of the hinge pin 40, for instance, by inclusion of a counterbore 27. A locking pin 43 (see FIG. 4) can be installed in the hinge pin 40 proximate the second hinge support 22B to assist in holding the hinge pin 40 in a fixed position relative to the check valve housing 20.

Figure 4:
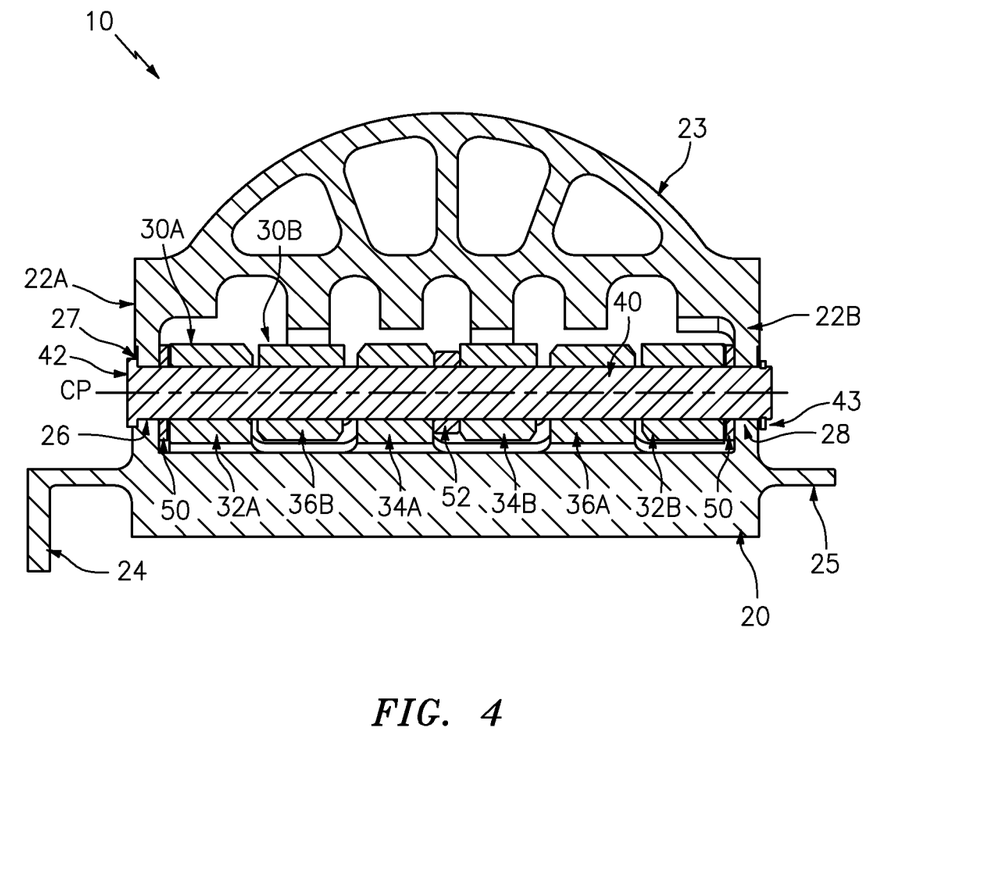
FIG. 4 is a sectional view of the check valve of FIG. 2 according to an embodiment.

The first and second check valve flappers 30A and 30B are pivotably coupled to the hinge pin 40 as depicted in FIG. 4. A pair of end spacers 50 on the hinge pin 40 separate the first and second check valve flappers 30A and 30B from the first and second hinge supports 22A and 22B. A middle spacer 52 on the hinge pin 40 separates the first and second check valve flappers 30A and 30B from each other. The first and second check valve flappers 30A and 30B are arranged in a 180 degree opposite orientation relative to each other such that a lower ear 32A of the first check valve flapper 30A is adjacent to an end spacer 50 and an upper ear 36B of the second check valve flapper 30B on the hinge pin 40. A middle ear 34A of the first check valve flapper 30A is adjacent to the upper ear 36B of the second check valve flapper 30B and the middle spacer 52 on the hinge pin 40. A middle ear 34B of the second check valve flapper 30B is adjacent to the middle spacer 52 and an upper ear 36A of the first check valve flapper 30A on the hinge pin 40. A lower ear 32B of the second check valve flapper 30B is adjacent to the upper ear 36A of the first check valve flapper 30A and an end spacer 50 on the hinge pin 40.

Figure 3:
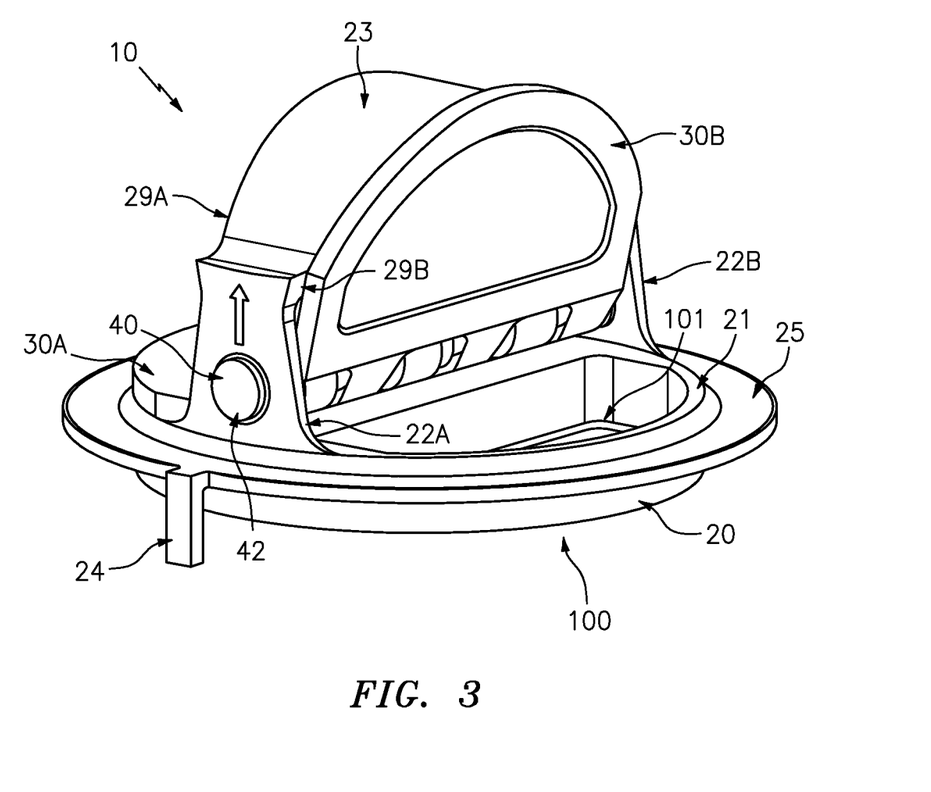
FIG. 3 is another perspective view of the check valve of FIG. 2 according to an embodiment.

The first and second check valve flappers 30A and 30B pivot about the central pivot axis CP in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second check valve flappers 30A and 30B are configured to pivot from respective closed positions at which the first and second check valve flappers 30A and 30B prevent fluid flow through the openings 101 to respective open positions at which fluid flow through the openings 101 is permitted. In the example of FIGS. 2 and 3, the first check valve flapper 30A is depicted in a closed position, and the second check valve flapper 30B is depicted in an open position.

The stop 23 of the check valve housing 20 has first and second opposite sides 29A and 29B. The first side 29A is associated with the first check valve flapper 30A, while the second side 29B is associated with the second check valve flapper 30B. When the first and second check valve flappers 30A and 30B are disposed in the respective closed positions, the first and second check valve flappers 30A and 30B are displaced from the first and second sides 29A and 29B. When the first and second check valve flappers 30A and 30B pivot to the respective open positions, the first and second check valve flappers 30A and 30B impact and make contact with the first and second sides 29A and 29B, respectively.

Figure 5:
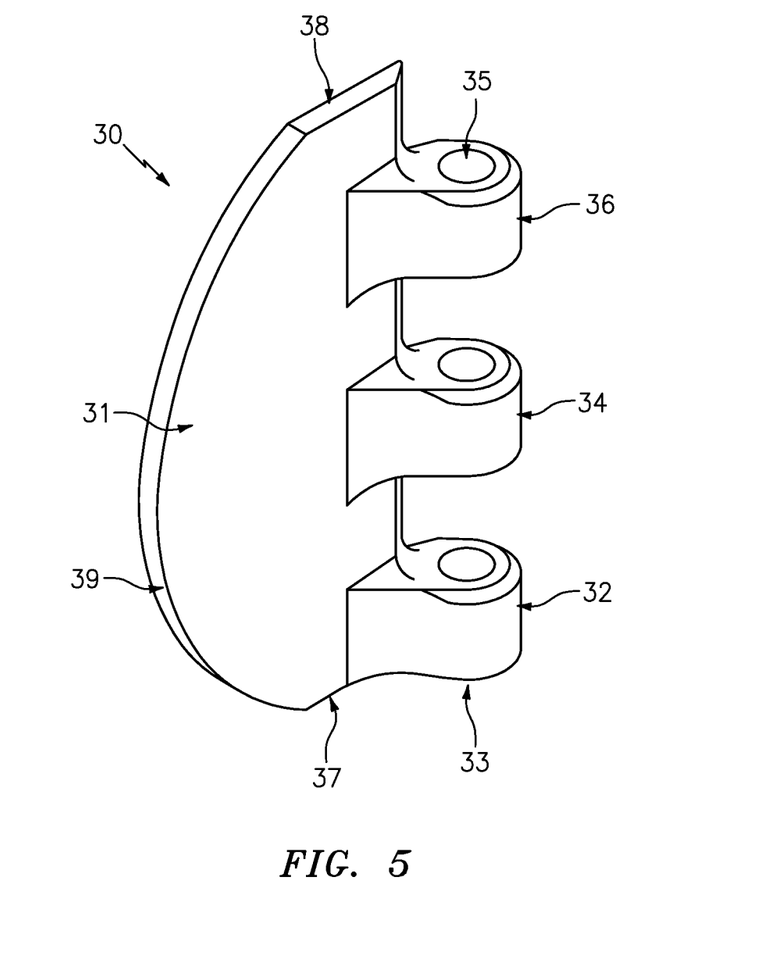
FIG. 5 is a perspective view of a check valve flapper according to an embodiment.

FIG. 5 is a perspective view of a check valve flapper 30 according to an embodiment. The check valve flapper 30 is a generalized instance of the first and second check valve flappers 30A and 30B of FIGS. 2-4. The check valve flapper 30 includes a flapper body 31 and a hinge portion 33 extending therefrom that includes a lower ear 32, a middle ear 34, and an upper ear 36. Each of the lower, middle, and upper ears 32, 34, and 36 includes a hinge pin hole 35 to receive the hinge pin 40 of FIGS. 2-4. The lower ear 32 aligns with a lower edge 37 of the flapper body 31, while the upper ear 36 is offset from an upper edge 38 of the flapper body 31. An arcuate edge 39 extends between lower edge 37 and the upper edge 38 of the flapper body 31 to substantially align with curvature of the stop 23 of FIGS. 2-4.

Figure 6:
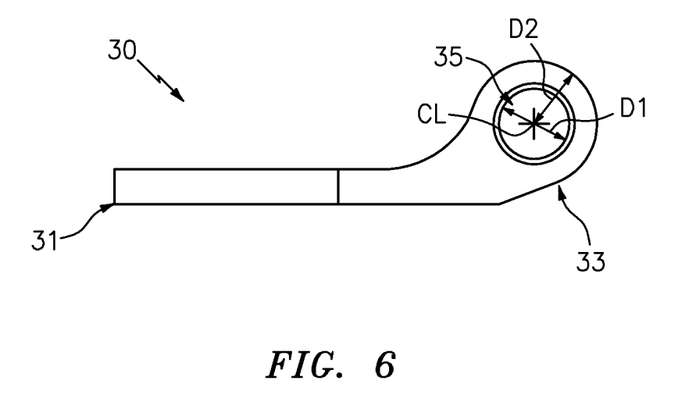
FIG. 6 is an end view of the check valve flapper of FIG. 5 according to an embodiment.

FIG. 6 is an end view of the check valve flapper 30 of FIG. 5 according to an embodiment. FIG. 6 further illustrates the hinge portion 33 extending from the flapper body 31 of the check valve flapper 30. The hinge pin hole 35 passes through the hinge portion 33 including the lower, middle, and upper ears 32, 34, and 36 of FIG. 5. A centerline CL is defined through the center of the hinge pin hole 35 to align with the central pivot axis CP (FIG. 4) upon insertion of the hinge pin 40 of FIGS. 2-4. In an embodiment, the hinge pin hole 35 of the lower, middle, and upper ears 32, 34, and 36 of FIG. 5 has a hinge pin hole diameter D1 of about 0.32 inches (0.813 cm). In an embodiment, each of the lower, middle, and upper ears 32, 34, and 36 of FIG. 5 also has an ear outer radius D2 of about 0.279 inches (0.709 cm). A ratio of the hinge pin hole diameter D1 to the ear outer radius D2 is between 0.83 and 0.91.

Figure 7:
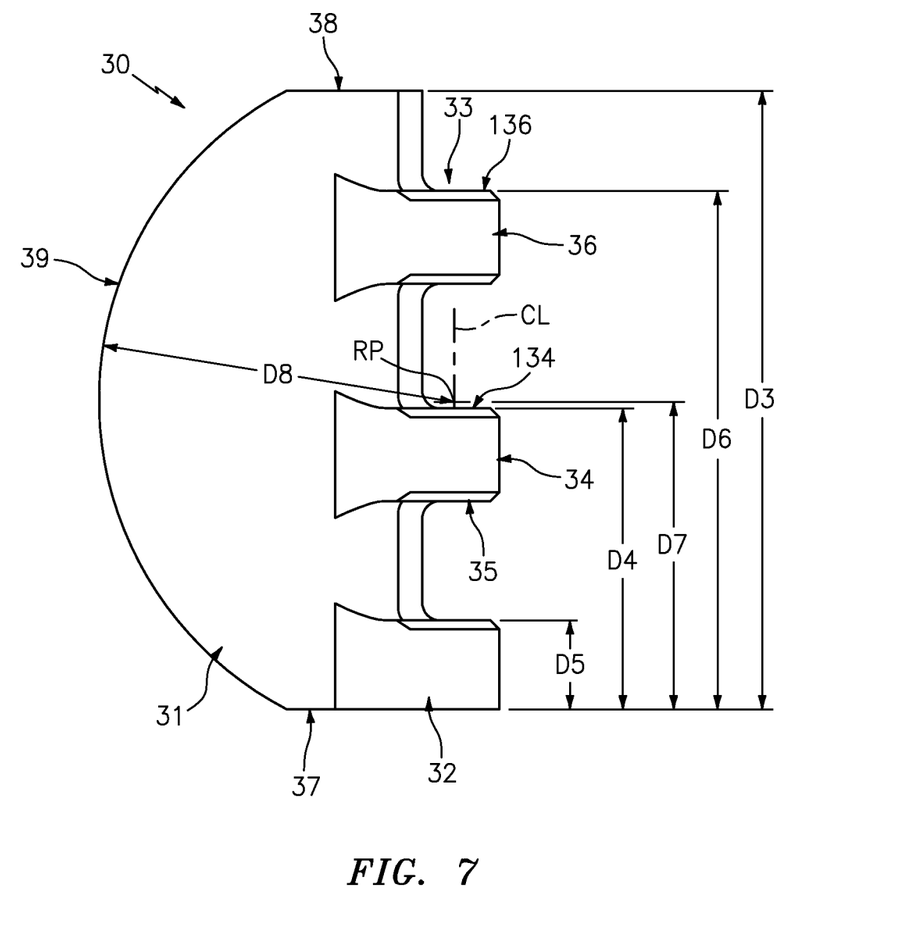
FIG. 7 is a side view of the check valve flapper of FIG. 5 according to an embodiment.

FIG. 7 is a side view of the check valve flapper 30 of FIG. 5 according to an embodiment. As can be seen in FIG. 7 and as previously described, the flapper body 31 of the check valve flapper 30 includes upper edge 38, lower edge 37, and arcuate edge 39. The lower ear 32 aligns with the lower edge 37 of the flapper body 31. The upper ear 36 is offset from the upper edge of 38 the flapper body 31, i.e., the upper ear 36 does not align with the upper edge 38. A check valve flapper length D3 is defined between the lower edge 37 of the flapper body 31 and the upper edge 38 of the flapper body 31. In an embodiment, the check valve flapper length D3 is about 3.268 inches (8.301 cm). A middle ear offset D4 is defined as a distance from the lower edge 37 of the flapper body 31 to an uppermost edge 134 of the middle ear 34. In an embodiment, the middle ear offset D4 is about 1.559 inches (3.960 cm). A ratio of the check valve flapper length D3 to the middle ear offset D4 is between 2.08 and 2.11. The lower ear 32 has a lower ear width D5. In an embodiment, the lower ear width D5 is about 0.48 inches (1.219 cm). A ratio of the check valve flapper length D3 to the lower ear width D5 is between 6.72 and 6.90. An upper ear offset D6 is defined as a distance from the lower edge 37 of the flapper body 31 to an uppermost edge 136 of the upper ear 36. In an embodiment, the upper ear offset D6 is about 2.743 inches (6.967 cm). A ratio of the check valve flapper length D3 to the upper ear offset D6 is between 1.18 and 1.20.

A reference point RP is defined on the centerline CL extending above the middle ear 34 at a distance D7 from the lower edge 37 of the flapper body 31. In an embodiment, the distance D7 is about half of the check valve flapper length D3. A flapper arcuate radius D8 is defined as a distance between the reference point RP and the arcuate edge 39 of the flapper body 31. In an embodiment, the flapper arcuate radius D8 is about 1.85 inches (4.699 cm). A ratio of the check valve flapper length D3 to the flapper arcuate radius D8 is between 1.76 and 1.77. Proper sizing enables free rotation of the check valve flapper 30 while reducing fatigue wear related to repeated high velocity impact of the flapper body 31 with one of the sides 29A, 29B of the stop 23 of FIGS. 2-4. Ear sizing and placement can also reduce wear and premature cracking of the end spacers 50 and the middle spacer 52 of FIG. 4.

A method of installing the first and second check valve flappers 30A and 30B in a check valve 10 is described in reference to FIGS. 2-7. A hinge portion 33 of a first check valve flapper 30A is arranged opposite a hinge portion 33 of a second check valve flapper 30B. A hinge pin 40 is inserted through a first hinge support 22A of a check valve housing 20, through the hinge portions 33 of the first and second check valve flappers 30A and 30B, and through a second hinge support 22B of the check valve housing 20. As previously described, a pair of end spacers 50 on the hinge pin 40 may separate the first and second check valve flappers 30A and 30B from the first and second hinge supports 22A and 22B, and a middle spacer 52 on the hinge pin 40 can separate the first and second check valve flappers 30A and 30B from each other. The hinge pin 40 can be guided through the hinge pin hole 35 of the lower, middle, and upper ears 32, 34, and 36 of the first and second check valve flappers 30A and 30B such that centerline CL of the hinge pin hole 35 aligns with the central pivot axis CP. The hinge pin head 42 can be slightly recessed into the counterbore 27, and the hinge pin 40 secured into position by inserting locking pin 43 in the hinge pin 40 proximate the second hinge support 22B of the check valve housing 20. As previously described, the first and second check valve flappers 30A and 30B may each be instances of the check valve flapper 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve flapper for a check valve, comprising:
   a flapper body comprising an upper edge, a lower edge, and an arcuate edge between the upper edge and the lower edge, wherein curvature of the arcuate edge substantially aligns with curvature of a stop of the check valve; and
   a hinge portion extending from the flapper body, the hinge portion comprising a lower ear, a middle ear, and an upper ear, wherein the lower ear, the middle ear, and the upper ear each comprise a hinge pin hole having a hinge pin hole diameter and an ear outer radius, and a ratio of the hinge pin hole diameter to the ear outer radius is between 0.83 and 0.91, wherein the lower ear aligns with the lower edge of the flapper body, the upper ear is offset from the upper edge of the flapper body, a check valve flapper length is defined between the lower edge of the flapper body and the upper edge of the flapper body, a middle ear offset is defined as a distance from the lower edge of the flapper body to an uppermost edge of the middle ear, a ratio of the check valve flapper length to the middle ear offset is between 2.08 and 2.11, the lower ear has a lower ear width, and a ratio of the check valve flapper length to the lower ear width is between 6.72 and 6.90.

2. The check valve flapper according to claim 1, wherein an upper ear offset is defined as a distance from the lower edge of the flapper body to an uppermost edge of the upper ear, and a ratio of the check valve flapper length to the upper ear offset is between 1.18 and 1.20.

3. The check valve flapper according to claim 1, wherein a reference point is defined on a centerline extending above the middle ear at half of the check valve flapper length from the lower edge of the flapper body, a flapper arcuate radius is defined as a distance between the reference point and the arcuate edge of the flapper body, and a ratio of the check valve flapper length to the flapper arcuate radius is between 1.76 and 1.77.

4. A method of installing check valve flappers in a check valve, the method comprising:
   arranging a hinge portion of a first check valve flapper opposite a hinge portion of a second check valve flapper; and
   inserting a hinge pin through a first hinge support of a check valve housing, through the hinge portions of the first and second check valve flappers, and through a second hinge support of the check valve housing, wherein each of the first and second check valve flappers comprise a flapper body and the hinge portion extending therefrom, the hinge portion comprising a lower ear, a middle ear, and an upper ear, wherein the lower ear, the middle ear, and the upper ear each comprise a hinge pin hole having a hinge pin hole diameter and an ear outer radius, and a ratio of the hinge pin hole diameter to the ear outer radius is between 0.83 and 0.91, wherein the flapper body further comprises an upper edge, a lower edge, and an arcuate edge between the upper edge and the lower edge, wherein curvature of the arcuate edge substantially aligns with curvature of a stop of the check valve, the lower ear aligns with the lower edge of the flapper body, the upper ear is offset from the upper edge of the flapper body, a check valve flapper length is defined between the lower edge of the flapper body and the upper edge of the flapper body, a middle ear offset is defined as a distance from the lower edge of the flapper body to an uppermost edge of the middle ear, a ratio of the check valve flapper length to the middle ear offset is between 2.08 and 2.11, the lower ear has a lower ear width, and a ratio of the check valve flapper length to the lower ear width is between 6.72 and 6.90.

5. The method according to claim 4, wherein an upper ear offset is defined as a distance from the lower edge of the flapper body to an uppermost edge of the upper ear, and a ratio of the check valve flapper length to the upper ear offset is between 1.18 and 1.20.

6. The method according to claim 4, wherein a reference point is defined on a centerline extending above the middle ear at half of the check valve flapper length from the lower edge of the flapper body, a flapper arcuate radius is defined as a distance between the reference point and the arcuate edge of the flapper body, and a ratio of the check valve flapper length to the flapper arcuate radius is between 1.76 and 1.77.

* * * * *